US012412115B2

United States Patent
Lee et al.

(10) Patent No.: US 12,412,115 B2
(45) Date of Patent: Sep. 9, 2025

(54) METHOD FOR DECODING COLOUR CODES OVER A QUANTUM ERASURE CHANNEL

(71) Applicant: COMMISSARIAT A L'ENERGIE ATOMIQUE ET AUX ENERGIES ALTERNATIVES, Paris (FR)

(72) Inventors: Sangjun Lee, Cedex 09 (FR); Valentin Savin, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 1003 days.

(21) Appl. No.: 17/342,314

(22) Filed: Jun. 8, 2021

(65) Prior Publication Data

US 2022/0101172 A1    Mar. 31, 2022

(30) Foreign Application Priority Data

Jun. 9, 2020  (EP) .................................... 20179033

(51) Int. Cl.
  *G06N 10/70*  (2022.01)
  *G06N 5/047*  (2023.01)
  *G06N 10/20*  (2022.01)
  *G06N 10/40*  (2022.01)

(52) U.S. Cl.
  CPC ............. *G06N 10/70* (2022.01); *G06N 5/047* (2013.01); *G06N 10/20* (2022.01); *G06N 10/40* (2022.01)

(58) Field of Classification Search
  CPC ........ G06N 5/047; G06N 10/20; G06N 10/40; G06N 10/70
  See application file for complete search history.

(56) References Cited

U.S. PATENT DOCUMENTS

2019/0044543 A1*  2/2019  Chamberland ........ G06N 10/00
2021/0124640 A1*  4/2021  Nickerson .............. G06N 10/70

OTHER PUBLICATIONS

Landahl, Andrew J., Jonas T. Anderson, and Patrick R. Rice. "Fault-tolerant quantum computing with color codes." arXiv preprint arXiv:1108.5738 (2011). (Year: 2011).*

Roffe, Joschka. "Quantum error correction: an introductory guide." Contemporary Physics 60, No. 3 (2019): 226-245. (Year: 2019).*

(Continued)

*Primary Examiner* — Kamran Afshar
*Assistant Examiner* — Simon Fischer Ellis
(74) *Attorney, Agent, or Firm* — Oblon, McClelland, Maier & Neustadt, L.L.P.

(57) ABSTRACT

A method for correcting a color code over a quantum erasure channel. First, a forest spanning the erased qubits over the lattice defining the color code is determined and syndrome qubits are calculated for each face of the tiling. If none of the faces of the tiling is touched by more than one tree, the erased qubits of each tree are sequentially decoded according to a trimming process. If a face of the tiling is touched by different trees, pseudo-erasures can be first inserted in order to connect these trees and the extended forest is subjected to the trimming process. Where a face of the tiling touched by a leaf is also touched by another vertex of the forest, the vertex belonging to this face and to the forest can be inactivated, and when the trimming process is terminated, a linear system with variables associated by the inactivated vertices of the forest is solved.

10 Claims, 8 Drawing Sheets

(56) References Cited

OTHER PUBLICATIONS

Criger, Ben, and Barbara Terhal. "Noise thresholds for the [[4, 2, 2]]-concatenated toric code." arXiv preprint arXiv:1604.04062 (2016). (Year: 2016).*

Delfosse, Nicolas, and Gilles Zemor. "Linear-time maximum likelihood decoding of surface codes over the quantum erasure channel." Physical Review Research 2, No. 3 (2020): 033042. (Year: 2020).*

Das, Poulami, Christopher A. Pattison, Srilatha Manne, Douglas Carmean, Krysta Svore, Moinuddin Qureshi, and Nicolas Delfosse. "A scalable decoder micro-architecture for fault-tolerant quantum computing." arXiv preprint arXiv:2001.06598 (2020). (Year: 2020).*

S. Lee, M. Mhalla and V. Savin, "Trimming Decoding of Color Codes over the Quantum Erasure Channel," 2020 IEEE International Symposium on Information Theory (ISIT), Los Angeles, CA, USA, 2020, pp. 1886-1890, doi: 10.1109/ISIT44484.2020.9174084. (Year: 2020).*

Delfosse, Nicolas, and Gilles Zémor. "Linear-Time Maximum Likelihood Decoding of Surface Codes over the Quantum Erasure Channel." arXiv preprint arXiv:1703.01517 (2017). (Year: 2017).*

European Search Report Issued Dec. 23, 2020 in European Application 20179033.4 filed on Jun. 9, 2020, 1 page.

Arun B. Aloshious, et al., "Erasure decoding of two-dimensional color codes", Physical Review A, vol. 100, No. 4, Oct. 14, 2019, 9 pages.

Andrew J. Landhal et al., "Fault-tolerant quantum computing with color codes", Cornell University Library, XP080523409, Aug. 29, 2011, 28 pages.

Joschka Roffe, "Quantum Error Correction: An Introductory Guide", Contemporary Physics, vol. 60, No. 3, Oct. 2019, 29 pages.

H. Bombin, et al., "Topological Quantum Distillation", Physical Review Letters, vol. 97, No. 18, Oct. 2006, 4 pages.

Aleksander Kubica, et al., "Efficient color code decoders in $d \geq 2$ dimensions from toric code decoders" 2019 arXiv: 1905.07393, 29 pages.

Nicolas Delfosse, et al., "Almost-linear decoding algorithm for topological codes", Sep. 2017 arXiv:1709.06218, 10 pages.

Michael A. Nielsen, et al., "Quantum computation and quantum information", Cambridge University Press, 2016, 698 pages.

U.S. Appl. No. 17/191,882, filed Mar. 4, 2021, Savin.

* cited by examiner

METHOD FOR DECODING COLOUR CODES OVER A QUANTUM ERASURE CHANNEL

FIELD OF THE INVENTION

The present invention concerns the field of quantum computation and more particularly of quantum error correction (QEC). It relates more specifically to a method of decoding colour codes over a quantum erasure channel.

BACKGROUND OF THE INVENTION

Quantum computers make use of quantum-mechanical phenomena such as superposition and entanglement to perform computation. Through precise control of these phenomena, it is in principle possible for quantum computers to outperform their classical counterparts. Quantum computation is based on the manipulation of quantum bits or "qubits" which can be regarded as a superposition of the 1 and 0 states of a quantum physical variable.

A general introduction to quantum computation can be found in the reference book entitled "Quantum computation and quantum information" authored by M. A. Nielsen and I. L. Chuang, Cambridge University Press, 2016.

Although various technologies exist for implementing quantum computers, they all share the same shortcomings, namely that the qubits are affected by external noise and decoherence. Whereas bits in classical computers are materialized at the physical level by on/off states of transistor switches with high error margins, there is no such security for qubits. Indeed, the fragile superposition of states of a qubit may easily be disturbed by its environment and collapse, resulting in a loss of information. Quantum computers therefore fundamentally require error correction at the physical level.

Simple transposition of classical error correction schemes cannot be envisaged though, since qubits are subject to the no-cloning theorem i.e. quantum information cannot be duplicated in the same way as classical information. Furthermore, any measurement of a qubit causes a collapse to either state $|0\rangle$ or $|1\rangle$, thereby preventing restoration of the original information.

The first quantum error correcting codes were independently found by Shor and Steane and a general theory of quantum error correction was subsequently developed. An introduction to quantum error correction can be found in the paper of J. Roffe entitled "Quantum Error Correction: an introductory guide" published in Contemporary Physics, vol. 60, no. 3, pp. 226-245, October 2019.

The basic principle of quantum error correction coding is to associate the state of each logical qubit with a joint state of a set of underlying physical qubits. From a theoretical point of view, this amounts to expanding the size of a Hilbert space needed for representing a single qubit to a much larger space in which the error on the individual qubits are mapped to a set of mutually orthogonal subspaces.

More specifically, let us consider first a single qubit. It can generally be expressed as a superposition of basis states $|0\rangle$ and $|1\rangle$:

$$|\psi\rangle = \alpha|0\rangle + \beta|1\rangle \quad (1)$$

where $\alpha$ and $\beta$ are complex numbers, such that $|\alpha|^2+|\beta|^2=1$. It is recalled that when this qubit is measured, we get either the state $|0\rangle$ with probability $|\alpha|^2$ or $|1\rangle$ with probability $|\beta|^2$. It is often convenient to represent a single qubit as point on the Bloch sphere:

$$|\psi\rangle = \cos\frac{\theta}{2}|0\rangle + e^{i\varphi}\sin\frac{\theta}{2}|1\rangle \quad (2)$$

where $\theta$ is the angle between $|\psi\rangle$ and the z-axis and $\varphi$ is the angle between the x-axis and the projection of $|\psi\rangle$ on the Oxy plane. It is recalled that state $|0\rangle$ is conventionally represented by the point of coordinate $z=+1$ and state $|1\rangle$ the point of coordinate $z=-1$ on the Bloch sphere.

A coherent error (for a closed quantum system) affecting a single qubit transforms a superposition state into another superposition state of the Bloch sphere and therefore can be mathematically represented by a unitary operator, E. Such an operator can be decomposed in the Pauli basis of two-dimensional matrices of complex values:

$$E = \varepsilon_I I + \varepsilon_X X + \varepsilon_Z Z + \varepsilon_Y Y \quad (3)$$

where $\varepsilon_I$, $\varepsilon_X$, $\varepsilon_Z$, $\varepsilon_Y$ are the expansion coefficients and the Pauli matrices are:

$$I = \begin{pmatrix} 1 & 0 \\ 0 & 1 \end{pmatrix}, \quad (4\text{-}1)$$

the identity matrix $$X = \begin{pmatrix} 0 & 1 \\ 1 & 0 \end{pmatrix}, \quad (4\text{-}2)$$

a 180° rotation around the $Ox$ axis or bit-flip $$Z = \begin{pmatrix} 1 & 0 \\ 0 & -1 \end{pmatrix}, \quad (4\text{-}3)$$

a 180° rotation around the $Oz$ axis or phase-flip $$Y = \begin{pmatrix} 0 & -i \\ i & 0 \end{pmatrix} = iXZ, \quad (4\text{-}4)$$

a combination of bit-flip and phase-flip

From expression (3) and (4-4), it can be understood that, if an error correcting code is able to correct an error of the X-type (i.e. a bit-flip) or of the Z-type (i.e. a phase-flip), it can correct any coherent error. This decomposition property is also called discretization of quantum error.

We can therefore restrict ourselves to errors represented by operators $X^p Z^q$ where $p=0,1$ and $q=0,1$.

Furthermore, the Pauli matrices operating on a single qubit define a group, denoted $P_1=\{\pm I, \pm iI, \pm X, \pm iX, \pm Y, \pm iY, \pm Z, \pm iZ\}$.

Considering now a multi qubit system, that is a quantum system (or register) of n qubits, a basis state $|\Psi\rangle_n$ of this system can be represented by the tensor product:

$$|\psi\rangle_n = |\psi_1\rangle \otimes |\psi_2\rangle \otimes \ldots \otimes |\psi_n\rangle \quad (5)$$

where $|\psi_1\rangle, |\psi_2\rangle, \ldots, |\psi_n\rangle$ are respective basis states of the elementary qubits.

Similarly, an error affecting a multi qubit system state can be expressed as a tensor product of operators:

$$E = E_1 \otimes E_2 \otimes \ldots \otimes E_n \quad (6)$$

where the $E_i$, $i=1, \ldots, n$ have the form given in (3).

By the same token, the correction of errors in the multi qubit system can be restricted to those belonging to the n-fold Pauli group $P^{\otimes n} = P_1 \otimes \ldots \otimes P_1$, namely by the tensor product operators:

$$X^{p_1} Z^{q_1} \otimes X^{p_2} Z^{q_2} \otimes \ldots \otimes X^{p_n} Z^{q_n} \quad (7)$$

where $p_i$, $q_i$, $i=1, \ldots, n$ are bits which can take values 0 or 1.

In classical error control coding (ECC), the codewords satisfy a given set of parity constraints. The calculation of a syndrome indicates whether these constraints are met.

The code space, that is the space spanning the codewords is characterised by a null syndrome. Expressed otherwise, the code space and the error space are orthogonal.

Transposed to a multi qubit system of size n, the code space C is a $2^k$-dimension subspace of the $2^n$-dimension Hilbert space, spanned by code vectors which are obtained by entangling n elementary qubits. A general state of the code space is also called an encoded state or a logical state. It can be expressed as a superposition of the code vectors.

The code space can alternatively be described by a stabilizer group, that is, a set of commuting operators forming an Abelian subgroup of the n-fold Pauli group $P^{\otimes n}$. An element of the stabilizer group is simply referred to as a stabilizer. The code space is the intersection of the subspaces fixed by each of the stabilizers, or put differently, the intersection of their eigenspaces with eigenvalue+1. Since stabilizers all commute, it can be verified that the above intersection is not empty, provided that the stabilizer group does not contain $-I^{\otimes n}$.

The stabilizer group can be decomposed into cyclic groups (Kronecker decomposition) the generators of which are stabilizers that can be used for calculating the syndromes of any Pauli error $E \in P^{\otimes n}$. They can be regarded as equivalent parity check constraints for classical ECC codes.

If we denote the set of generators by $S = \{s_1, s_2, \ldots, s_m\} \subset P^{\otimes n}$ such that $[s_i, s_j] = 0$ and, the stabilizer code associated with S is defined by:

$$C = \{|\Psi\rangle_n s.t. s_i |\Psi\rangle_n = |\Psi\rangle_n\} \tag{8}$$

An error E translates into the syndromes $[E, s_i] \in \{-1, +1\}$, $i=1, \ldots n$ from which a correction operator can be deduced (error decoding).

Taking the example of a 2-qubit system, the code space spanned by $|00\rangle$ and $|11\rangle$ can be alternatively described by the stabilizer $Z_1 \otimes Z_2$ where $Z_1$ is a phase-flip operator acting on the first qubit and $Z_2$ is a phase-flip operator acting on the second qubit. $Z_1 \otimes Z_2$ leaves unchanged any vector (logical state) belonging to the code space whereas it changes the sign of any errored vector such as $X_1 \otimes I_2 |\Psi\rangle_n$ or $I_1 \otimes X_2 |\Psi\rangle_n$. In other words, the code space corresponds to (+1) eigenvalue subspace and the error space corresponds to the (−1) eigenvalue subspace.

CSS codes (named after their inventors R. Calderbank, P. Shor and A. Steane) are a family of stabilizer codes defined by the subgroup of $P^{\otimes n}$:

$$S = \{s_1, s_2, \ldots, s_m\} \text{ where } s_i \in \{I, X\}^{\otimes n} \text{ or } s_i \in \{I, Z\}^{\otimes n} \tag{9}$$

The syndromes calculated with the operators $s_i \in \{I, Z\}^{\otimes n}$ allow to correct the X-type errors (bit-flip errors) and those calculated with the operators $s_i \in \{I, X\}^{\otimes n}$ allow to correct the Z-type error (phase-flip errors). Hence, the decoding of a CSS code can be split into independent correction of X-type and Z-type errors.

Topological stabilizer codes are a class of stabilizer codes with geometrically local generators. More specifically, physical qubits can be placed on a manifold, e.g. a torus, so that the code has only stabilizer generators with local support. Topological codes only require local operations for syndrome extraction.

Colour codes constitute a specific category of topological codes introduced by H. Bombin and M. A. Martin-Delgado in their article entitled "Topological quantum distillation" published in Physical Review Letters, vol. 97, no. 18, October 2006, p. 180501.

Colour codes in two dimensions are CSS stabilizer codes which are defined on a 2D lattice. Their locality property and bidimensional structure make them good candidates for practical implementations. Furthermore, by construction, colour codes allow to perform logical operations fault-tolerantly.

The 2D lattice is obtained from a tiling of the 2-torus and meets the following constraints: each vertex represents a qubit and has three incident edges (hence each vertex is 3-valent), the tiling is 3-colourable, three colours being sufficient to label all the faces of the tiling such that no adjacent faces share the same colour.

Regular three-colourable tilings are generally denoted b.g.r where b,g,r are the respective numbers of edges of the faces of each colour. A tiling is called regular if the faces of same color have the same number of edges. Three types of lattices are possible for a regular 2D colour code, namely a hexagonal lattice (6.6.6 tiling) as represented in FIG. 1A, a square-hexagon-dodecagon lattice (4.6.12 tiling) as represented in FIG. 1B and a square-octagon lattice (4.8.8 tiling) as represented in FIG. 1C.

Figure 1A:
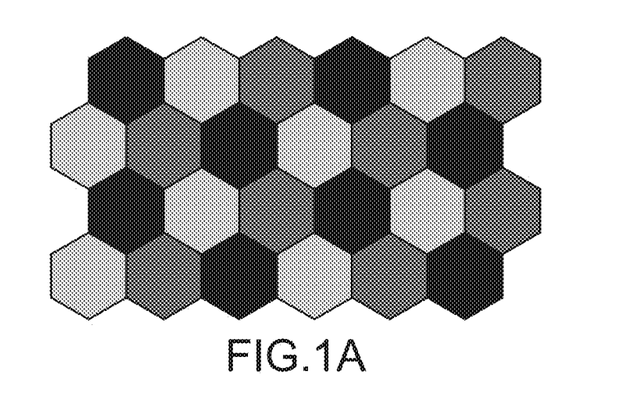
FIG. 1A, already described, schematically represents a 6.6.6 tiling defining a first type of colour code known from the prior art.
Figure 1B:
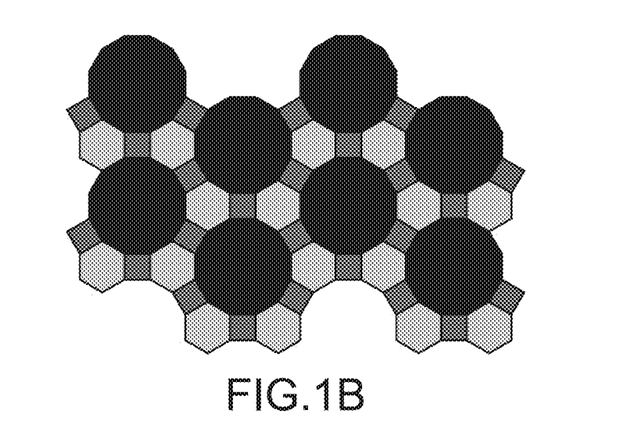
FIG. 1B, already described, schematically represents a 4.6.12 tiling defining a second type of colour code known from the prior art.
Figure 1C:
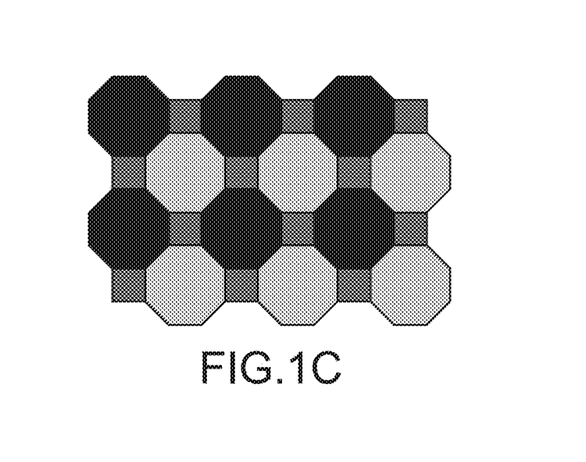
FIG. 1C, already described, schematically represents a 4.8.8 tiling defining a third type of colour code known from the prior art.
Figure 2A:
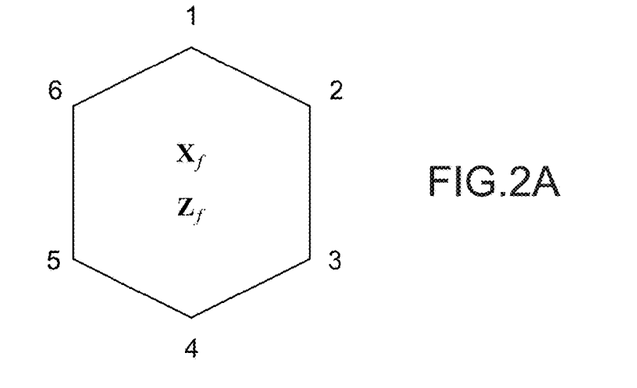
FIG. 2A, already described, schematically represents a face of the tiling of FIG. 1A with six data qubits and two stabilizer generators.

FIG. 2A shows a face f of the coloured code tiling represented in FIG. 1A.

Each face f is associated with two stabilizer generators, $X_f, Z_f$ defined by:

$$X_f = X_1 \otimes X_2 \otimes X_3 \otimes X_4 \otimes X_5 \otimes X_6 \tag{10-1}$$

$$Z_f = Z_1 \otimes Z_2 \otimes Z_3 \otimes Z_4 \otimes Z_5 \otimes Z_6 \tag{10-2}$$

More generally, for a given face f of a colour code tiling, stabilizer generator $X_f$ is the tensor product of the Pauli X operators on each qubit incident on this face.

Similarly, for a given face f, stabilizer generator $Z_f$ is the tensor product of the Pauli Z on each qubit incident on this face.

The code space associated with a face f is defined by the intersection of the +1 eigenspaces of the $X_f$ and $Z_f$ operators. It is important to note that the whole code space is the intersection of the $X_f$ and $Z_f$ operators for all the faces of the tiling. However, $X_f$ and $Z_f$ only have a local effect, namely on the qubits associated with the vertices of face f, and leave unchanged the other qubits associated with the other vertices of the lattice (in other words, the operator I appears in the tensor product for this qubits).

The operator $X_f$ is used to identify the Z-errors affecting the qubits associated with the vertices of face f. The measurement of this operator provides a Z-syndrome bit, $z_f$, which is equal to −1 if the number of Z-errors on the face vertices is odd and equal to 20+1 if the number of Z-errors on the face vertices is even.

Similarly, the operator $Z_f$ is used to identify the X-errors affecting the qubits associated with the vertices of face f. The measurement of this operator provides a X-syndrome bit, $x_f$, which is equal to −1 if the number of X-errors on the face vertices is odd and equal to +1 if the number of X-errors on the face vertices is even.

Figure 2B:
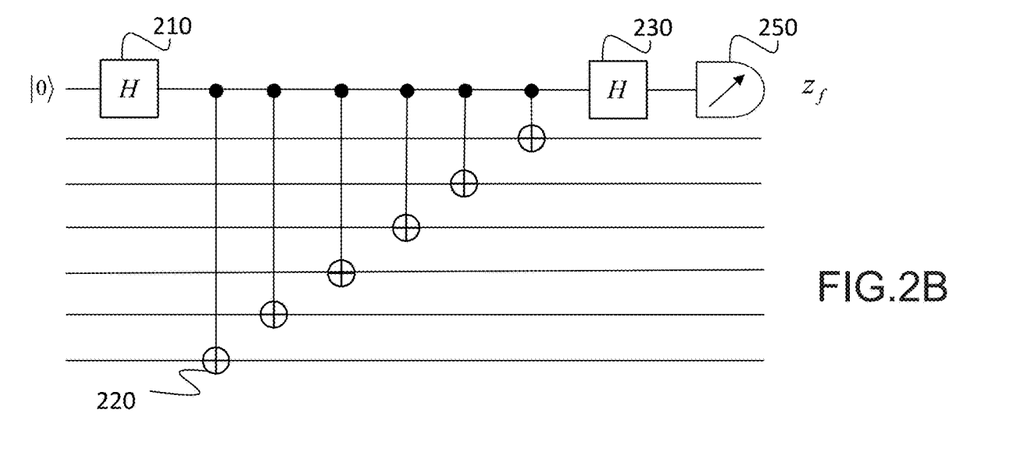
FIG. 2B, already described, schematically represents an example of a circuit for calculating a first syndrome qubit, capable of identifying a Z-error in the data qubits of FIG. 2A.

FIG. 2B represents an example of a circuit for calculating a Z-syndrome qubit, capable of identifying a Z-error in the data qubits of FIG. 2A.

This circuit comprises a plurality of CNOT (controlled-NOT) gates, 220, and a measurement gate, 250. The CNOT gates respectively input the 6 qubits of the face represented in FIG. 2A.

First an ancilla qubit $|0\rangle$ is prared and input to an Hadamard gate, 210, to obtain the state $|+\rangle=(|0\rangle+|1\rangle)/\sqrt{2}$, which controls the CNOT gates 220 for creating Bell states. The result is then subjected to an Hadamard transform in 230, and to a measurement in 250. This circuit measures operator $X_f$, thereby extracting the Z-syndrome bit, $z_f$, of the qubits associated with the face vertices.

Figure 2C:
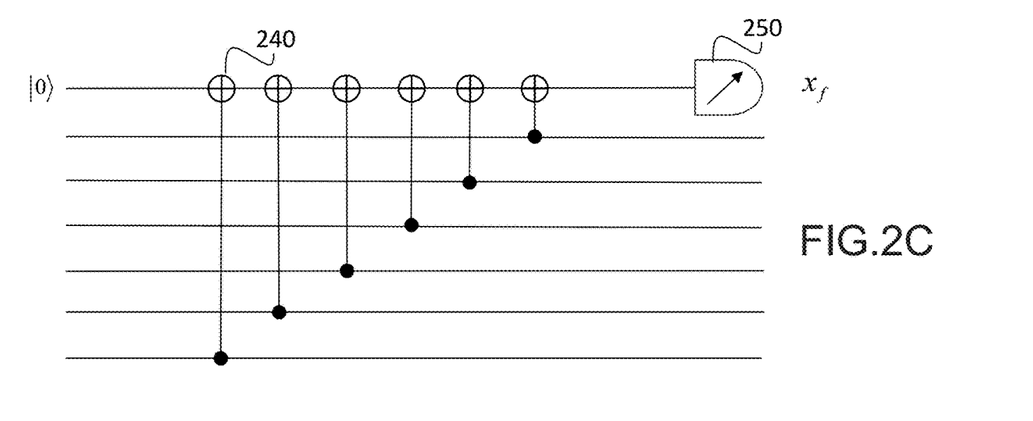
FIG. 2C, already described, schematically represents an example of a circuit for calculating a second syndrome qubit, capable of identifying an X-error in the data qubits of FIG. 2A.

FIG. 2C represents an example of a circuit for calculating an X-syndrome qubit, capable of identifying a X-error in the data qubits of FIG. 2A.

This circuit comprises a plurality of CNOT (controlled-NOT) gates, 240, in series, (orientated in the direction opposite to the CNOT gates 220) and respectively controlled by the 6 qubits of the face, the first CNOT gate inputting a prepared ancilla qubit $|0\rangle$.

The result is then input to measurement gate 250. This circuit measures operator $Z_f$, thereby extracting the X-syndrome bit of the qubits associates with the face vertices.

Different techniques have been proposed for decoding colour codes. Decoding means determining the most probable error E affecting the set of qubits from the extracted syndromes and recovering the most likely set of qubits.

In particular, it is known from the paper of Kubica et al. entitled "Efficient colour code decoders in d≥2 dimensions from toric code decoders" published in 2019 as arXiv: 1905.07393 to project a colour code onto surface codes. The thus obtained surface codes can be then decoded according to a so-called Minimum-Weight Perfect Matching (MWPM) algorithm, the complexity of which is however not linear with the number of physical qubits. More recently, a so-called Union-Find decoder using a peeling algorithm for correcting erasures over the quantum erasure channel, has shown its capability to be run (in the worst case) in almost linear time with respect to the number of physical qubits. A presentation of the Union-Find decoder can be found in the paper of N. Delfosse et al. entitled "Almost-linear decoding algorithm for topological codes" published in September 2017 as arXiv:1709.06218.

However, using a Union-Find decoder for decoding a colour code still requires a prior projection on surface codes, decoding the obtained surface codes, and lifting back the error estimates to the original colour code, which is quite a complex process.

An object of the present invention is therefore to propose a method for decoding colour codes which is simpler and more efficient than those known from the prior art. In particular, the present invention enables to find an almost maximum-likelihood decoding solution in linear time or a maximum-likelihood decoding solution in almost linear time.

BRIEF DESCRIPTION OF THE INVENTION

The present invention is defined by the appended independent claim. Various preferred embodiments are defined in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

We will consider in the following a 2D colour code as set out in the introduction. Without loss of generality and for the sake of simplicity, we will also assume that the colour code is based on a hexagonal lattice, that is a 6.6.6 three coloured tiling. In particular, the man skilled in the art will understand that the present equally applies to a 4.8.8 or 4.6.12 tiling as mentioned above or more generally to any other regular, or possibly irregular, 3-colourable tiling.

We recall that the physical qubits of the code are associated with the vertices of the lattice and that each face f of the tiling is associated with a X-type stabiliser, $X_f$, and a Z-type stabiliser, $Z_f$, advantageously defined by expressions (10-1) and (10-2). The $X_f$ and $Z_f$ stabilisers are implemented by circuits comprising quantum gates, as described in relation with FIGS. 2*b*-2C.

The measurement of $X_f$ over the qubits incident on f (that is associated with the vertices of f) provides a Z-syndrome bit $z_f$ indicating the parity of the number of Z-type Pauli errors, namely the number of phase flips affecting these qubits.

The measurement of $Z_f$ over the qubits incident on f (that is associated with the vertices of f) provides a X-syndrome bit, $x_f$ indicating the parity of the number of X type Pauli errors, namely the number of bit flips affecting these qubits.

The present invention concerns the decoding of a colour code over a quantum erasure channel (QEC), that is the correction of erased qubits. Erasures are defined as arbitrary errors at known locations in the lattice. More specifically, a qubit is considered as erased if it is affected by a random Pauli error belonging to the set of operators {I,X,Z,XZ}, each operator having the same probability (25%). Operator I corresponds to the case of a non-erroneous qubit, operator X to the case of a bit-flip, operator Z to the case of a phase flip and operator XZ to the combination of phase-flip and bit-flip.

The present invention can be used in particular as a subroutine for error decoding more general Pauli error models, similarly to the Union-Find decoder mentioned above.

Figure 3:
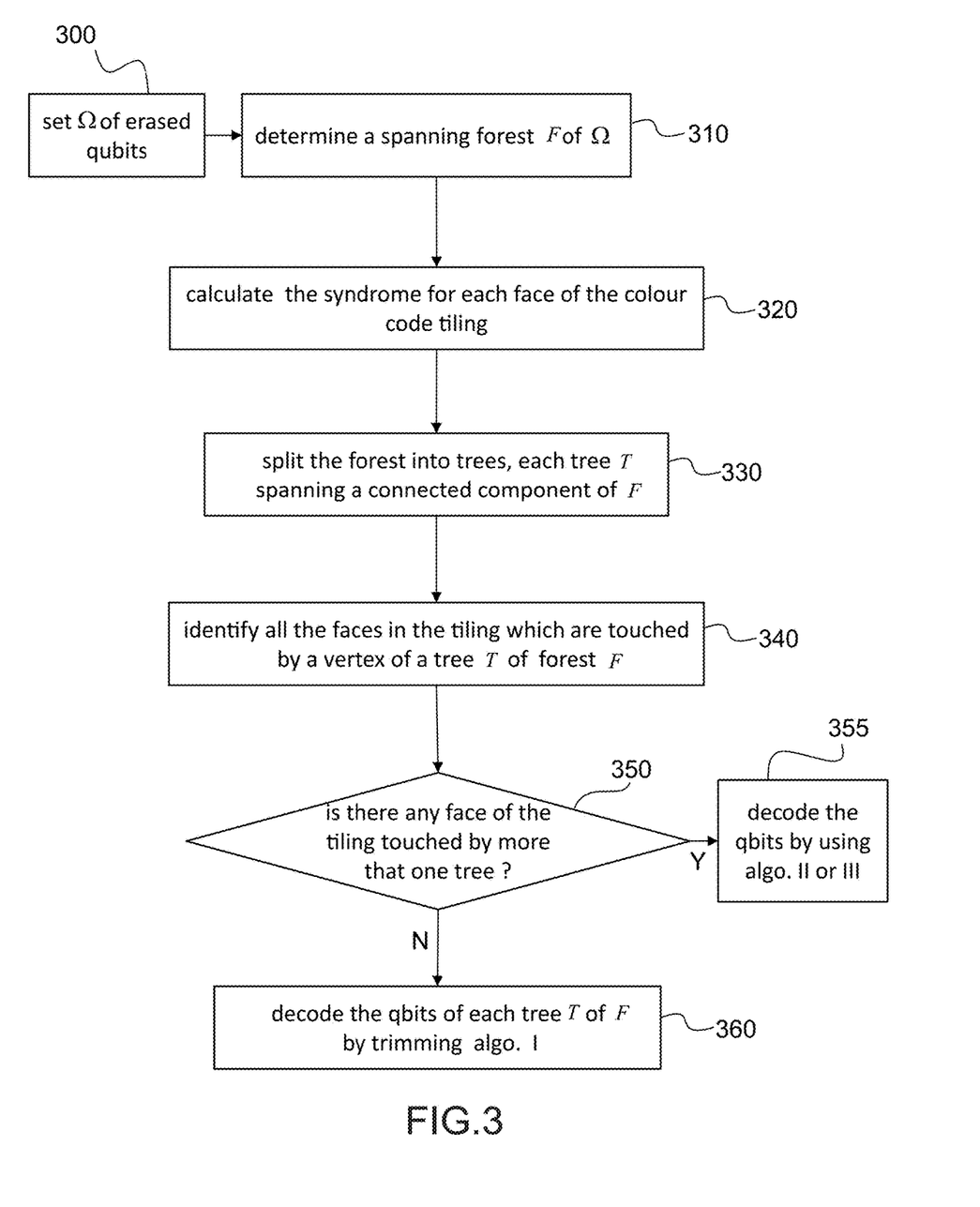
FIG. 3 represents a flow chart of a colour code decoding method according to an embodiment of the present invention.

FIG. 3 represents a flow chart of a colour code decoding method according to an embodiment of the present invention.

The decoding method inputs the set $\Omega$ of the erased physical qubits at step 300. These erased qubits can be identified for example as labels of vertices in the lattice where the erasures have occurred.

A spanning forest, F, spanning all the erased qubits of $\Omega$ is then determined in 310.

We recall that, in graph theory, a tree spanning an undirected connected graph G is a tree which includes all of the vertices of G, with the minimum possible number of edges. In general, a graph may have several spanning trees. If the graph G has several connected components which are disconnected with each other, it can be spanned by a spanning forest, that is a set of spanning trees, each tree spanning a connected component of said graph.

The set of vertices of $\Omega$ defines a graph G, two vertices of $\Omega$ sharing the same edge of a face in the tiling being linked by an edge of graph G. This graph is in general disconnected as cluster of erasures may be spaced apart in the lattice. However, each connected component of this graph may be spanned by a spanning tree thereby leading to a spanning forest.

The spanning forest F can be obtained by conventionally running a depth-first search (DFS) algorithm or a breadth-first search (BFS) algorithm on graph G.

At step 320, the syndrome for each face f of the code tiling is calculated. More specifically, a first syndrome bit is calculated by measuring the stabilizer operator $X_f$ on the qubits incident on this face, with the help of a first ancilla bit, and a second syndrome bit is calculated by measuring the stabilizer $Z_f$ operator on the same qubits, with the help of a second ancilla bit.

If the first (resp. second) syndrome bit is null, that is has a value +1, the number of phase flips (resp. bit flips) affecting the qubits incident on face is even (which is in particular the case when all the qubits in question are not erroneous). Conversely, if the first (resp. second) syndrome bit is non null, that is has a value −1, the number of phase flips (resp. bit flips) affecting these qubits is odd.

It is worth noting that the order of steps 310 and 320 in the flowchart is irrelevant.

At step 330, the spanning forest F is divided into trees, each tree T spanning a connected component of F, more precisely a connected component of the graph G generated by $\Omega$.

At step 340, the faces of the tiling which are touched by at least a vertex of a tree T of F are identified. By touched by a vertex we mean here that the vertex is an endpoint of an edge of the face in question.

If there exists at least one face in the tiling that is touched by more than one tree as checked at step 350, then the set $\Omega$ is qualified as non-trimmable and the decoding process goes on with 355. Two different algorithms can be used in 355 which are respectively described further below in relation with FIGS. 5 and 6.

Conversely, if no face of the tiling is touched by more than one tree of F, the set $\Omega$ is qualified as trimmable and the decoding proceeds further with 360 as described further below in relation with FIG. 4.

Figure 7:
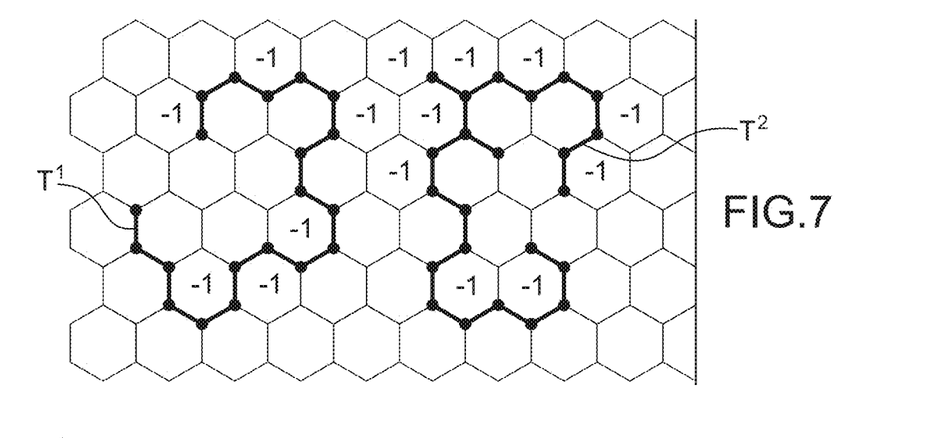
FIG. 7 schematically represents the tiling of a colour code with a forest spanning a first set of erasures over a quantum erasure channel.

Such a situation is illustrated in FIG. 7. The 6.6.6 colour code tiling has been represented uncoloured and the vertices with filled dots indicate the elements of Q, that is the erased qubits. The faces labelled "−1" are those for which the syndrome is not null, that is one syndrome bit or both is/are not null, i.e. $x_f=-1$ and/or $z_f=-1$. The non-labelled faces are those for which the syndrome is null, i.e. $x_f=+1$ and $z_f=+1$. The spanning forest F is composed here of two trees $T^1, T^2$, no face of the tiling being touched by both $T^1$ and $T^2$.

Figure 8:
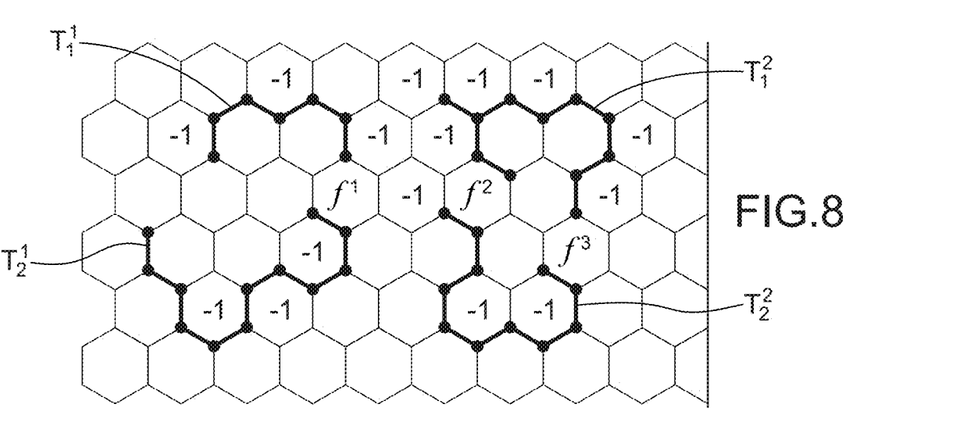
FIG. 8 schematically represents the tiling of a colour code with a forest spanning a second set of erasures over a quantum erasure channel.

By contrast, the situation of a non-trimmable forest has been represented in FIG. 8. The spanning forest is composed here of four trees $T_1^1, T_2^1, T_1^2, T_2^2$. Indeed, it can be noticed that face $f^1$ is touched by trees $T_1^1$ and $T_2^1$ and faces $f^2, f^3$ are touched by trees $T_1^2$ and $T_2^2$.

Figure 4:
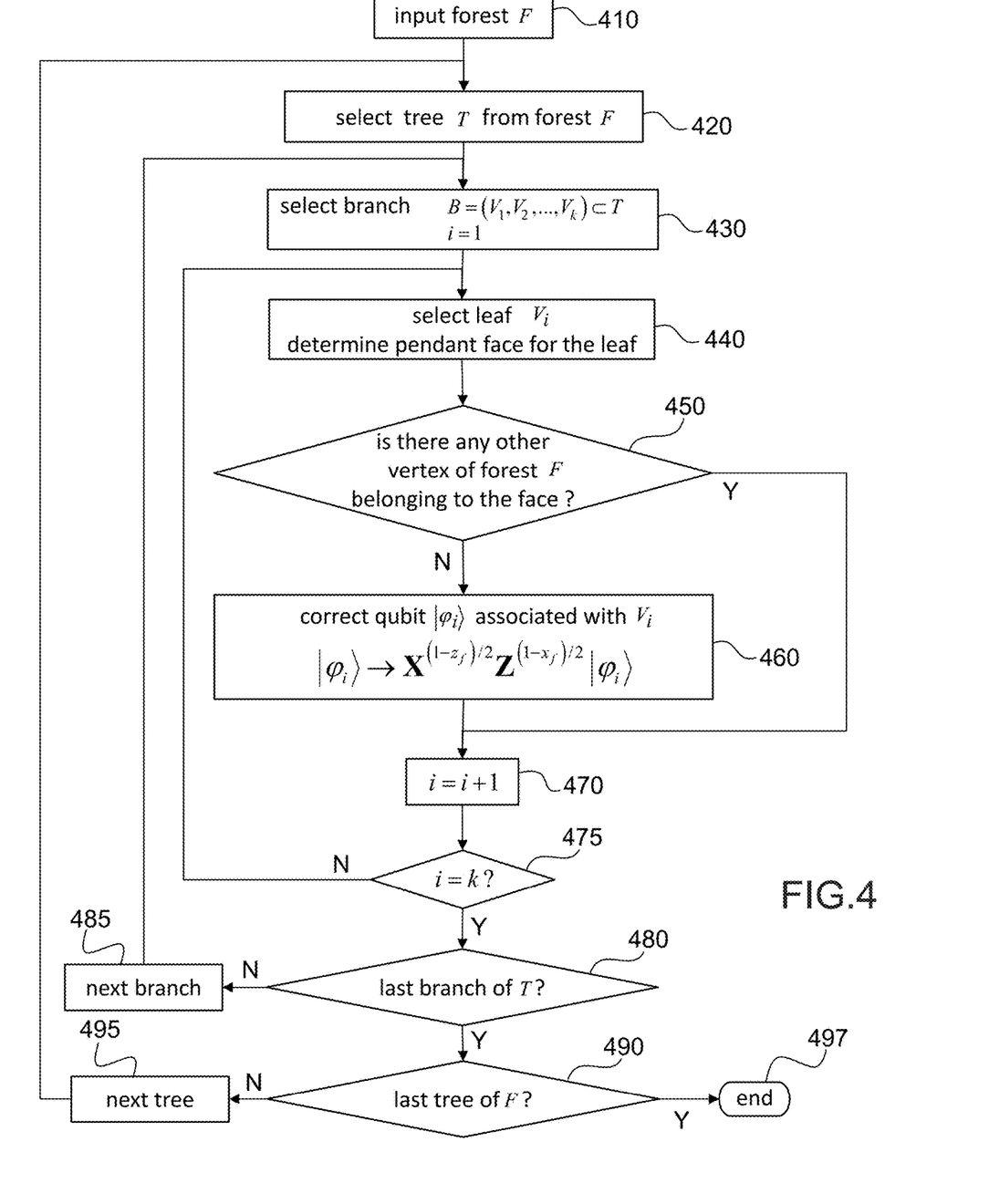
FIG. 4 represents a flow chart of a colour code decoding method according to the trimming process mentioned in FIG. 3.

FIG. 4 represents the flowchart of a colour code decoding method according a trimming process.

This decoding method iterates over the trees, branches and leaves of the spanning forest F, previously obtained.

More specifically, after inputting the spanning forest F at step 410, an iterative loop is entered.

At step 420 a tree T of forest F is selected, then at step 430 a branch of the tree and finally the leaf $V_i$ of the current branch B=$(V_1, V_2, \ldots, V_k)$ where k is the number of nodes of the branch.

For each leaf of the current branch starting from vertex V and progressively trimming the branch from $V_1$ to $V_{k-1}$, the pendant face of the current leaf is determined at step 440. By pendant face of a leaf $V_i$, we mean the face of the tiling for which the boundary comprises vertex $V_i$ but not vertex $V_{i+1}$ of branch B. If the branch B contains only one vertex (which may happen for isolated errors, or after trimming all the other vertices from the tree), any face of the tiling whose boundary comprises that vertex may be used as pendant face.

At step 450, it is checked whether another vertex of forest F belongs to the pendant face. Importantly, in the affirmative, the qubit associated with vertex $V_i$ is left unchanged, that is no error correction operation is made on $V_i$. Although performing no error correction operation on $V_i$ may appear as paradoxical, it can be shown that this does not affect the decoding process, due to the trimmable property of the erasure set.

The leaf is then trimmed at step 470 and it is proceeded to the next node of the branch, thus becoming a leaf.

Conversely, if the boundary of the pendant face does not contain any other vertex of forest F, the qubit $|\varphi_i\rangle$ associated with vertex V is corrected at step 460 by applying a correcting operator:

$$|\varphi_i\rangle \rightarrow X^{(1-x_f)/2} Z^{(1-z_f)/2} |\varphi_i\rangle \qquad (11)$$

where $(x_f, z_f)$ is the syndrome calculated for face f at step 320, $x_f$ being the X-syndrome bit and $z_f$ being the Z-syndrome bit. The leaf is then trimmed at step 470 and it is proceeded to the next node of the branch, thus becoming a leaf.

At step 475, it is checked whether the root of the branch has been reached, that is if i=k. If it is not the case, the decoding method proceeds with the next leaf at step 440. Conversely, if the root of the branch has been reached, it is checked at step 480 whether the last branch of tree T has been trimmed. If it is not the case, the decoding method proceeds with the next branch at step 485 and jump back to step 430.

Conversely, if all the branches of tree T have been trimmed, it is checked whether last tree of the spanning forest F has been processed. In the negative, the method proceeds with the next tree at step 495 and jumps back to step 420. Conversely, in the affirmative, the whole spanning forest has been processed and the decoding stop at step 497.

The man skilled in the art will understand that, in the present instance, the complete decoding of the erased qubits is linear time that is the time required for the complete decoding depends linearly with the number n of the physical qubits.

Figure 5:
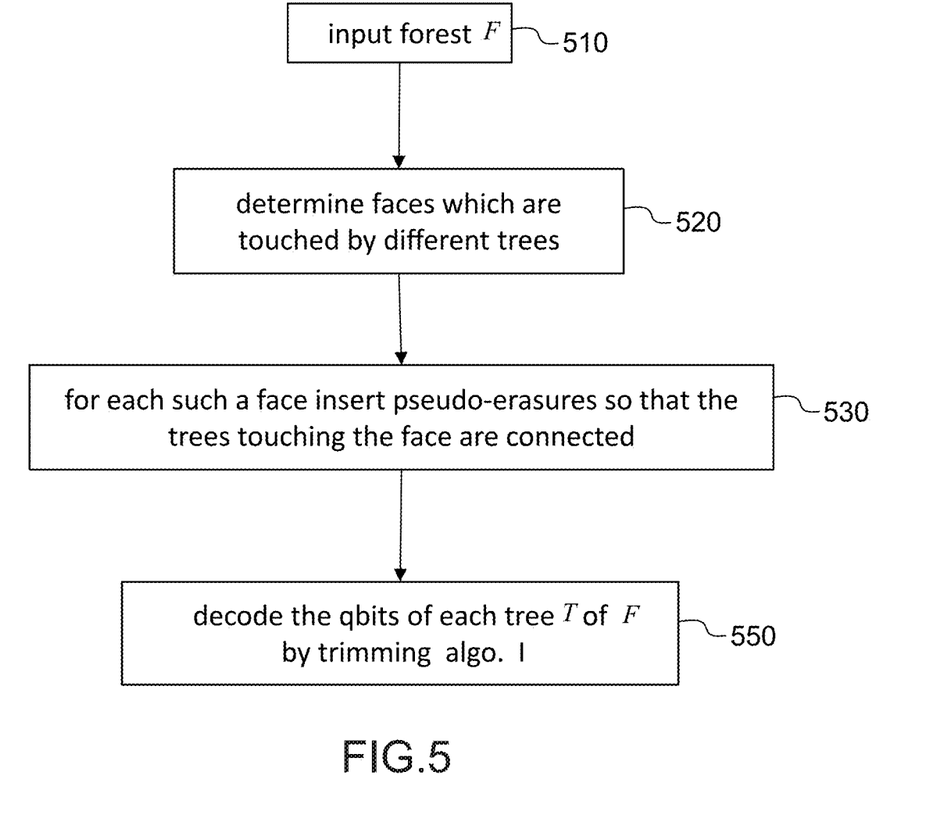
FIG. 5 represents a flow chart of a colour code decoding method according to a first variant of the present invention.

FIG. 5 represents a flowchart of a colour code decoding method according to a first variant of the present invention.

It is recalled that this decoding method is performed when at least one face of the tiling is touched by more than one tree of the spanning forest F.

The decoding method starts again with the spanning forest F at step 510.

First, the faces being touched by at least two trees of the forest are identified at step 520. For example, these faces are $f^1, f^2, f^3$ in FIG. 8.

For each such a face, at step 530, pseudo-erasures are inserted at some of their vertices so that the trees touching the face are connected. Note that in some instances, it may be necessary to insert a plurality (two in case of a hexagonal lattice) consecutive erasures if two trees touch the face at opposite vertices.

Figure 9:
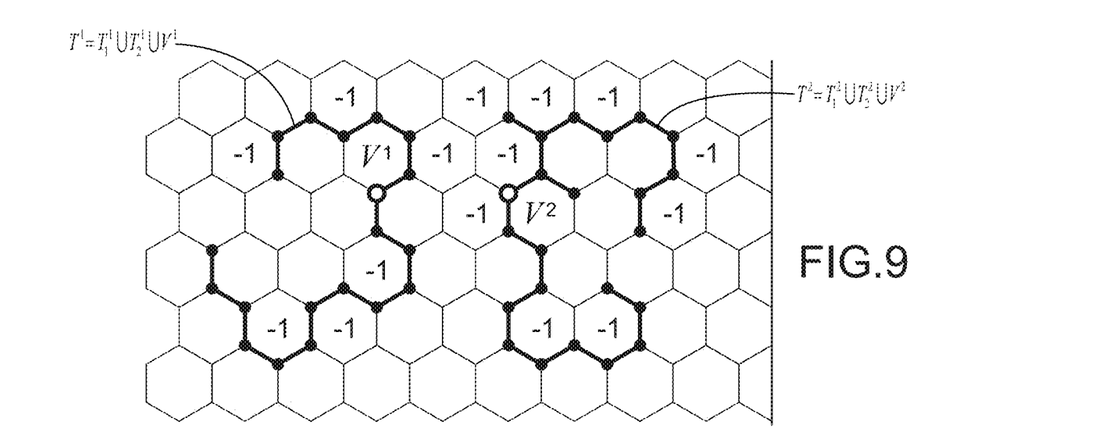
FIG. 9 schematically represents the tiling of FIG. 8 with an extended spanning forest.

For example, if we consider the spanning forest illustrated in FIG. 8, a pseudo-erasure can be inserted at vertex $V^1$ to connect trees $T_1^1$ and $T_2^1$ thereby forming a new tree of erasures, $T^1 = T_1^1 \cup T_2^1 \cup V^1$. Similarly, a pseudo-erasure can be inserted at vertex $V^2$ to connect trees $T_1^2$ and $T_2^2$ thereby forming a new tree of erasures, $T^2 = T_1^2 \cup T_2^2 \cup V^2$. Note that insertion of further pseudo-erasures is not necessary, the two trees touching face $f^3$ being already connected. The forest thus obtained contains less trees and is denoted F'.

The insertion of pseudo-erasures brings us back to a trimmable forest configuration and the decoding method illustrated in FIG. 4 can be applied at step 550 on forest F'.

As in the original trimmable configuration, the decoding can be performed in linear time.

Figure 6:
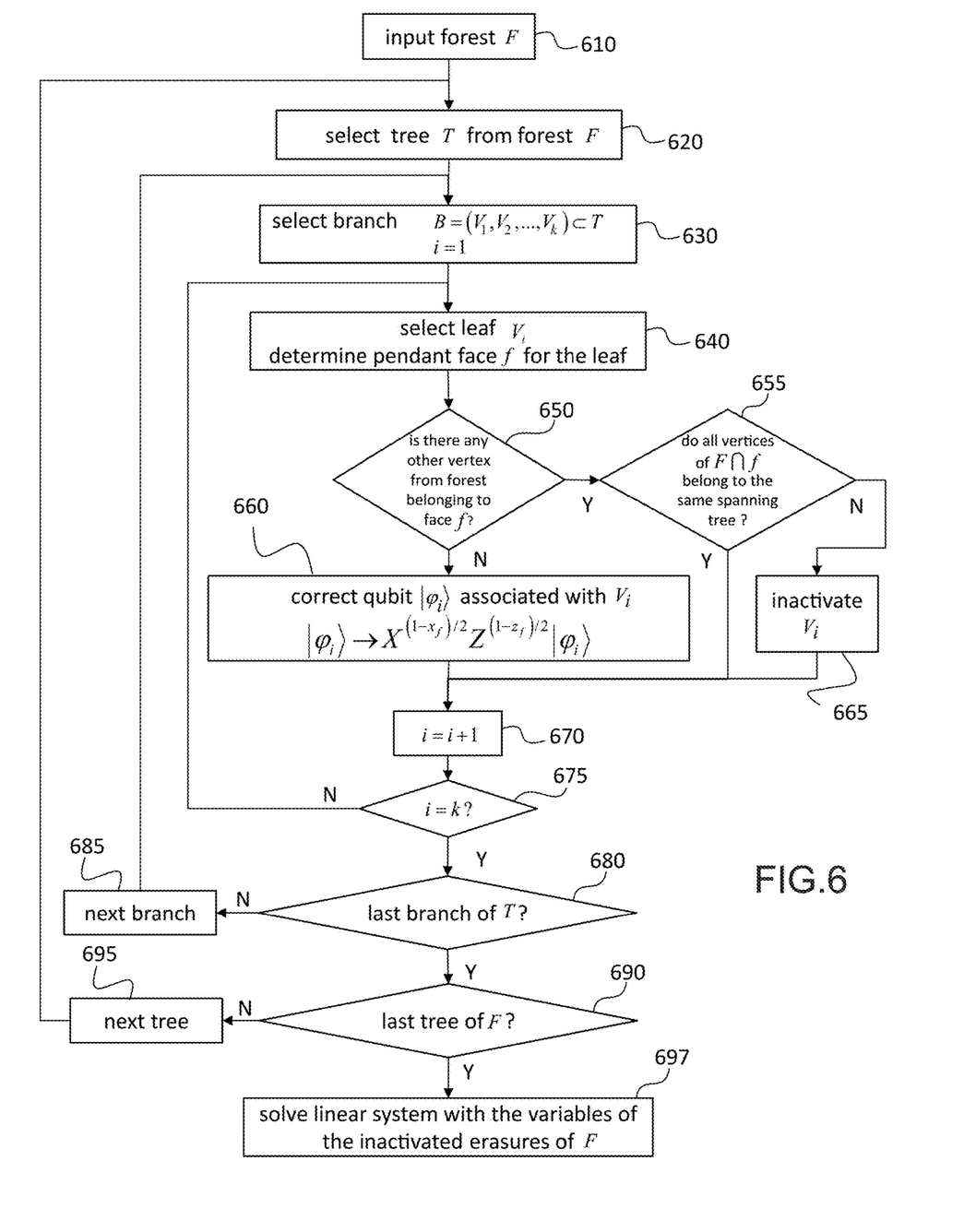
FIG. 6 represents a flow chart of a colour code decoding method according to a second variant of the present invention.

FIG. 6 represents a flowchart of a colour code decoding method according to a second variant of the present invention.

This decoding method is an alternative to the first variant set out above, it starts again with the spanning forest F at step 610 and then enters an iterative loop over the trees, branches and leaves as in FIG. 4, steps 620 to 650 being identical to steps 410 to 450.

However, after the pendant face f has been determined for current leaf $V_i$ at step 640, we consider two cases according to whether or not another vertex of forest F belongs to the face in question.

If another vertex of forest F belongs to face f, we again consider two cases, according to whether all the vertices in F∩f belong to the same spanning tree or not as checked in 655. If all the vertices in F∩f belong to the same spanning tree, which is thus necessarily the spanning tree containing $V_i$, the qubit associated with vertex $V_i$ is left unchanged (no error correction operation is made in $V_i$). If the vertices in F∩f belong to more than one spanning tree, the vertex $V_i$ is inactivated in 665. By inactivation of an erasure, it is meant that the binary values p,q of the four possible errors $X^p Z^q$ affecting the erased qubit are considered as variables, and propagated through subsequent decoding steps.

If there is no other vertex of F belonging to face f, as checked in 650, the qubit associated with vertex $V_i$ is corrected according to (11).

Steps 670 to 695 are respectively identical to steps 470 to 495.

However, after the forest has been completely parsed, a linear system linking the variables of the inactivated erasures with the syndrome bits of the faces comprising these erasures is solved at step 697. The solution of the linear system can conventionally be obtained by Gaussian elimination.

After having obtained the p,q values of the various inactivated erasures, the corresponding errors are corrected. More specifically, if we denote $|\varphi_i\rangle$ the state of the erased qubit, the qubit is recovered by applying thereto operator $X^p Z^q$:

$$|\varphi_i\rangle \to X^p Z^q |\varphi_i\rangle \tag{12}$$

The complexity of the decoding method is no more linear with time because solving the linear system dominates. Resolution of the linear system scales as the cube of the number of inactivated erasures but, since the number of inactivated erasures is very small with respect to the total number of erasures, the decoding method can be regarded as almost linear in time with respect to the number of qubits.

Whatever the variant used, it is important to note that the error decoding method provides a correction up to any element of the normalizer group of S in $P_n$, denoted N, that is the set of operators $P \in P_n$ such that P.S=S.P. Note that errors in N cannot be detected, as they commute with all the stabilizers, thus all the syndrome bits are null (equal to +1), in a same way as an error transforming a codeword into another codeword of a conventional ECC cannot be detected.

Figure 10A:
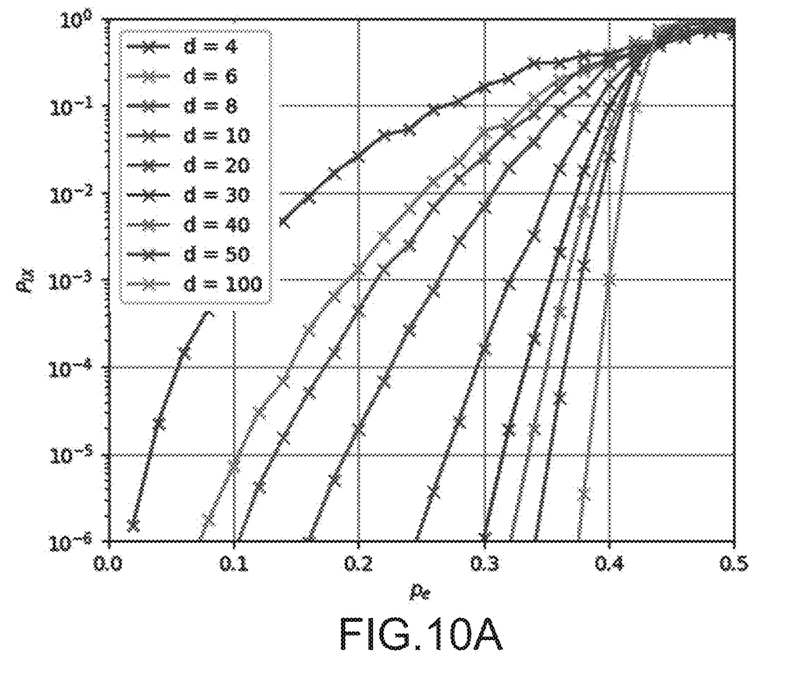
FIG. 10A represents the logical X-error rate vs. the erasure probability for a colour code based on a 6.6.6 tiling when using the first variant of the present invention.

FIG. 10A represents the logical X-error rate vs. the erasure probability for a colour code based on a 6.6.6 tiling when using the first variant of the present invention (pseudo-erasures insertion-based decoding). A similar figure would be obtained for the logical Z-error rate.

The curves of erasure probability are given for various minimum distances. It is recalled that the distance of a stabilizer code is defined by:

$$d = \min_{P \in N \setminus S} |P| \tag{13}$$

where |P| is the weight of an operator $P \in P_n$, i.e. the number of terms in the tensor product not equal to identity, S is the stabilizer group and N is the normalizer of S in $P_n$. The erasure correcting capability of a quantum error correcting code of distance d=t+1 amounts to t erasures.

It can be seen from the figure that the error correction threshold is about 0.43. In other words, if the erasure probability lies below 0.43 it is possible to efficiently perform error correction, assuming the size of the code is large enough.

Figure 10B:
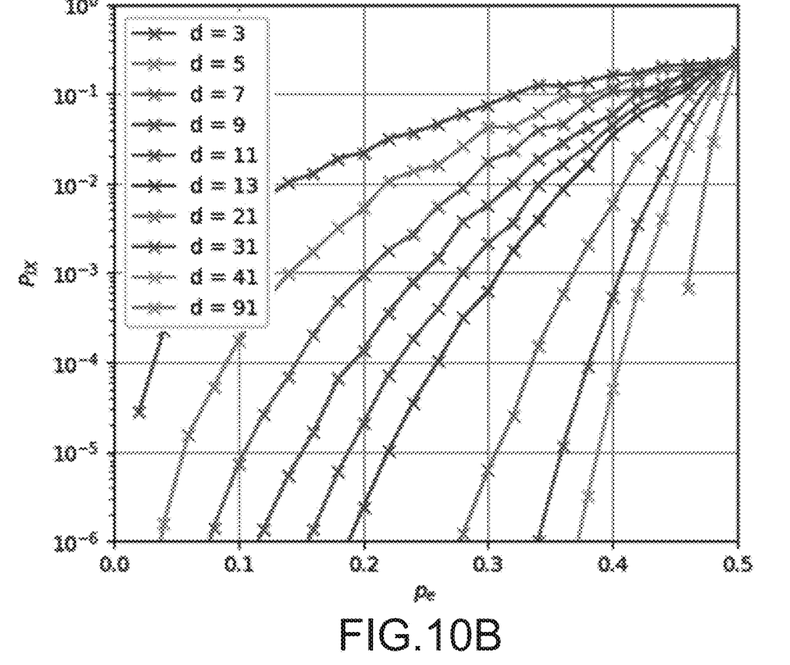
FIG. 10B represents the logical X-error rate vs. the erasure probability for a colour code based on a 6.6.6 tiling when using the second variant of the present invention.

FIG. 10B represents the X-error rate vs. the erasure probability for a colour code based on a 6.6.6 tiling when using the second variant of the present invention (inactivation-based decoding).

Again, the curves of erasure probability are given for various minimum distances.

It is noticed that the error correction threshold is about 0.5, higher than for the first variant, and that, for a given distance the logical error rate is lower than in the first variant. Hence, the second variant performs better than the first, although at the expense of a higher complexity.

The invention claimed is:

1. A method for correcting, by a decoder of a quantum computing system, a color code over a quantum erasure channel in the quantum computing system, the color code being defined by a bidimensional three-colorable tiling, any two adjacent faces of the tiling having different colors, the edges of the faces of the tiling defining a lattice, each vertex of the lattice being three-valent, each vertex representing a physical qubit, each face being associated with an X-type stabilizer and a Z-type stabilizer where X and Z are respectively a bit-flip Pauli operator and a phase-flip Pauli operator, the X-type stabilizer and the Z-type stabilizer being implemented as circuits comprising quantum gates, the method comprising:

receiving a set of erased physical qubits; and reconstructing a set of corrected physical qubits, based on the received set of erased physical qubits, by:

determining a forest F comprised of trees spanning the received set of the erased physical qubits;

calculating a syndrome for every face of the tiling by measuring the X-type stabilizer over the qubits incident of said face to obtain a first syndrome bit, and by measuring the Z-type stabilizer over the qubits incident of said face to obtain a second syndrome bit;

splitting the forest F into the said trees, each tree spanning a connected component of F;

identifying the faces of the tiling that are touched by at least one vertex of a tree of the forest F; and when determining that no face of the tiling is touched by more than one tree of the forest F, performing an iterative loop, including parsing each leaf of each branch of each tree of the forest, and when a current leaf is selected, determining a pendant face f for said current leaf, wherein when determining that there is another vertex of the forest F belonging to the face f, the qubit associated with the current leaf is left unchanged; and when determining that there is no other vertex of the forest F belonging to the face f, correcting the qubit associated with the current leaf to generate a corrected qubit by applying a correction operator $X^{(1-z_f)/2}Z^{(1-x_f)/2}$, wherein $z_f$ is the first syndrome bit and $x_f$ is the second syndrome bit calculated for face f.

2. The method for correcting a color code over a quantum erasure channel according to claim 1, further comprising:

when it is determined that a face of the tiling is touched by more than one tree of the forest F, determining the faces of the tiling which are touched by a plurality of trees, and for each such a face, inserting pseudo-erasures so that as to connect the plurality of trees to form a single tree, proceeding with the iterative loop, parsing each leaf of each branch of each tree of the forest thus obtained F', and when a current leaf is selected, determining a pendant face f for said current leaf, wherein when determining that there is another vertex of the forest F' belonging to face f, the qubit associated with the current leaf is left unchanged;

when determining that there is no other vertex of the forest F' belonging to face f, correcting the qubit associated with the current leaf by applying a correction operator $X^{(1-z_f)/2}Z^{(1-x_f)/2}$ wherein $z_f$ is the first syndrome bit and $x_f$ is the second syndrome bit calculated for face f.

3. The method for correcting a color code over the quantum erasure channel according to claim 1, wherein:

when it is determined that a face of the tiling is touched by more than one tree of forest F, proceeding with the iterative loop, parsing each leaf of each branch of each tree of the forest F, and when a current leaf is selected, determining a pendant face f for said current leaf and, when determining that there is another vertex of the forest F belonging to the face f, the erasure associated with the current leaf is inactivated unless all vertices of F, f belong to a same spanning tree and, otherwise, when determining that there is no other vertex of the forest F' belonging to the face f, the qubit associated with the current leaf is corrected by applying a correction operator $X^{(1-z_f)/2}Z^{(1-x_f)/2}$, wherein zf is the first syndrome bit and xf is the second syndrome bit calculated for the face f, and after the whole forest has been parsed, solving a linear system linking variables of inactivated erasures with the syndrome bits of the faces to determine a correction operator for each inactivated erasure; and correcting each qubit corresponding to an inactivated erasure by applying thereto the correction operator determined for said inactivated erasure.

4. The method for correcting a color code over the quantum erasure channel according to claim 3, wherein said linear system is solved by Gaussian elimination.

5. The method for correcting a color code over the quantum erasure channel according to claim 1, wherein each inactivated erasure is associated with a corresponding error operator $X^p Z^q$, wherein p,q are binary variables and a resolution of a linear system gives p,q binary values for each inactivated erasure.

6. The method for correcting a color code over a quantum erasure channel according to claim 5, further comprising correcting an erased qubit located at an inactivated erasure by applying thereto operator $X^p Z^q$, wherein p,q are the binary values for said inactivated erasure, obtained by solving said linear system.

7. The method for correcting a color code over the quantum erasure channel according to claim 1, wherein the tiling is of a 6.6.6 type, the lattice being hexagonal.

8. The method for correcting a color code over the quantum erasure channel according to claim 7, wherein the X-type stabilizer associated with a face f is defined by $X_f = X_1 \otimes X_2 \otimes X_3 \otimes X_4 \otimes X_5 \otimes X_6$ and the Z-type stabilizer associated with said face is defined by $Z_f = Z_1 \otimes Z_2 \otimes Z_3 \otimes Z_4 \otimes Z_5 \otimes Z_6$ are respectively the bit-flip Pauli operator and the phase-flip operator operating on the qubit associated with the vertex $V_i$ of face f.

9. The method for correcting a color code over the quantum erasure channel according to claim 1, wherein the tiling is of a 4.8.8 type.

10. The method for correcting a color code over the quantum erasure channel according to claim 1, wherein the tiling is of a 4.6.12 type.

* * * * *